Figure 1:
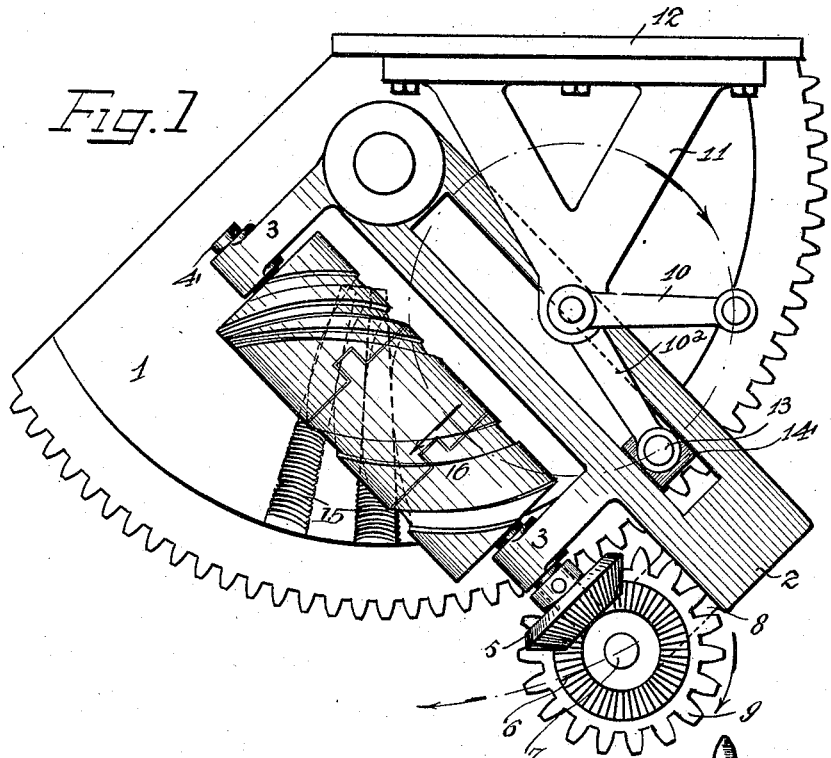

C. BRETON.
MEANS FOR MAKING GEAR CUTTING TOOLS.
APPLICATION FILED AUG. 20, 1914.

1,179,397.

Patented Apr. 18, 1916.

Witnesses:

CHARLES BRETON
Inventor

By *Marion & Marion*
Attorneys

UNITED STATES PATENT OFFICE.

CHARLES BRETON, OF CHICOUTIMI, QUEBEC, CANADA.

MEANS FOR MAKING GEAR-CUTTING TOOLS.

1,179,397.  Specification of Letters Patent.  Patented Apr. 18, 1916.

Application filed August 20, 1914. Serial No. 857,638.

*To all whom it may concern:*

Be it known that I, CHARLES BRETON, a citizen of the French Republic, residing at Chicoutimi, Province of Quebec, Canada, machinist, have invented certain new and useful Improvements in Means for Making Gear-Cutting Tools; and I do hereby declare that the following is a full, clear, and exact description of the invention, such as will enable others skilled in the art to which it appertains to make and use the same.

The invention to be hereinafter described relates to gear cutting tools and means for making the same.

In order to more clearly disclose the construction, operation, and use of the invention, reference should be had to the accompanying drawings forming part of the present application.

Throughout the several figures of the drawings like reference characters designate the same parts.

Figure 2:
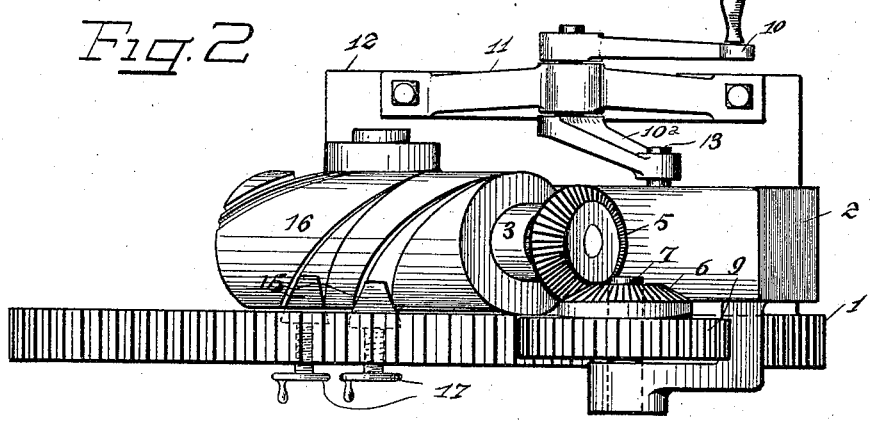
Figure 3:
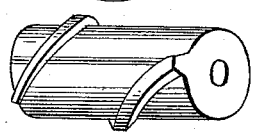

In the drawings: Figure 1 is a top plan view of the machine for making the tool; Fig. 2 is a side view of the same, and Fig. 3 is a perspective view of a completed tool.

The main objects of the invention are, to provide a compact, durable, and easily operated machine for producing tools having spiral cutting ribs for cutting gears, and to produce a tool of this character.

Referring to the drawings in detail, 1 designates a segmental rack which is rigidly secured in a horizontal plane on a suitable base. At the radial center of rack 1, a slotted beam 2 has its inner end pivotally secured. This beam is provided, on one side, with two arms 3 which support a rotatably mounted shaft 4. A bevel gear 5 is keyed on the outer end of this shaft, in mesh with a bevel gear 6 revoluble on the upper end of a stub shaft 7 carried by an arm 8 integral with beam 2 and projecting slightly below and in front of rack 1. A plain gear 9 is cast integral with gear 6 and is in mesh with the rack 1.

A double lever 10 is revolubly mounted above rack 1, in a bracket 11 secured to a back 12 integral with the rack. The lower arm 10ª of this lever is provided, on its inner end, with an integral eye which loosely receives a pin 13 integral with a block 14 slidable in the slot of beam 2.

The upper face of rack 1 is provided with two or more toothed cutting ribs 15 which are radially disposed and taper in width and height from the circumference toward the center of the rack. These ribs are mounted in grooves in the upper face of the rack and are adapted to have their outer ends raised. A hand screw 17 is threaded through rack 1, beneath the outer end of each rib. By turning this screw in, the outer end of the rib is raised, the inner end acting as a fulcrum. This enables the operator to adjust the rib to cut to any desired depth, at its outer end.

Fig. 1 shows said ribs as two in number, arranged with a slight interval between them to provide for cutting a pair of channels or grooves and leaving a rib between them.

To produce the tool, a suitably bored steel cylinder 16, composed of several short cylinders, is keyed on shaft 4 which is made demountable for this purpose. This cylinder, when so mounted, has its lower face a very slight distance above the upper face of rack 1. When mounting this cylinder the beam 2 is moved away from cutting ribs 15, so as to bring block 14 to the outer end of the slot of beam 2. After the cylinder is properly mounted, the upper arm of lever 10 is forced forward, in the direction of the arrow Fig. 1. The lower arm 10ª acts, through pin 13 and block 14, to force beam 2 forward. As the beam is forced forward, gear 9 is revolved by rack 1. This rotates shaft 4, through gears 5 and 6, and consequently cylinder 16, at a relatively high speed. As cylinder 16 advances, it engages the teeth of the cutting ribs 15, at an angle, due to the position of shaft 4 to one side of the axis of beam 2, as in Fig. 1. The pair of cutting ribs 15 cut a pair of helical channels in the superficial part of the cylinder from end to end thereof as said cylinder is carried forward by beam 2 and rotated on its axis by the gears before mentioned. These channels increase in width and depth from the inner end to the outer end of the cylinder as a result of the tapering form of said cutting ribs. Between the two channels there remains a relatively raised rib tapering from end to end of the cylinder. The remainder of the superficial part of the cylinder is then cut away in any convenient manner to the depth of the channel, leaving the tool with a raised rib and smooth surface excepting said rib, as shown in Fig. 3. The said rib is then sharpened, converting it into a cutting thread for the purpose stated. Of course the tool may be given as many cutting threads as desired by increasing the number of cutting ribs 15 on the segment, with consequent increase of channels cut in the cylinder and ribs formed between them. By varying the width of the intervals between the ribs 15, the maximum width of the rib cut on the cylinder will be varied also and by arranging the pairs of ribs 15 at greater or less intervals from each other the ribs on the cylinder may be spaced as desired.

This tool, when thus formed, can be used to cut gears from continuously revolved blanks. If it be mounted at an angle across the face of the blank, corresponding to its angle across the cutting ribs 15, and the tool is rotated and the blank revolved, at predetermined speeds, the spiral cutting rib of the tool will cut regularly spaced channels in the face of the blank, tapering from top to bottom, thus producing the gear. The space apart of the channels, taper, depth, &c., will depend on the space apart, taper, &c., of the cutting ribs of the machine which produced the tool. In other words, the tool will reproduce on the gear blank gear teeth which will correspond to the cutting ribs of the machine which produces the tool.

By making the tool of several cylinders, when it is desired to make a gear with narrow channels, the cylinders containing the narrow part of the cutting thread may be used. For a medium channel the first two cylinders will be used, &c.

It is thought that the construction, operation, and use of the invention will be clear from the preceding detailed description.

Having thus fully described my invention, what I claim as new and desire to secure by Letters Patent is:

1. In a machine of the character described, a fixed segmental rack, a beam pivotally connected thereto, a rotatable shaft carried by said beam, and gearing driven by the movement of said beam for rotating said shaft.

2. In combination with a fixed gear and fixed tapering cutting means, a pivoted part movable over the surface of said gear, a shaft carried by said part and gearing between said gear and said shaft for rotating the latter, the said shaft being adapted to carry a cylinder and the said cutting means and cylinder being arranged with relation to each other for cutting channels in said cylinder and leaving a tapering helical rib between them as the said cylinder is carried by said part over said cutting means.

3. In a machine of the character described, a fixed segmental rack, cutting means carried thereby, a beam mounted above the said rack and having its inner end pivotally connected thereto, at the radial center thereof, a rotatable shaft carried by said beam and located to one side of the longitudinal axis thereof, means for revolving the said beam over the said rack, and means for rotating the said shaft during the revolution of the beam.

4. In a machine of the character described, a fixed segmental rack, adjustable cutting means carried thereby, means for adjusting the said cutting means, a beam having its inner end pivotally secured at the radial center of the said rack and revoluble thereabove, means for revolving the said beam above the said rack, a rotatable shaft carried by the beam and located to one side of the longitudinal axis thereof, a revolubly mounted gear carried by the said beam and in mesh with the said rack, a bevel gear integral with the said revolubly mounted gear, and a second bevel gear in mesh with the said bevel gear and keyed on the outer end of the said rotatable shaft.

5. In a machine of the character described, a fixed segmental rack, radially disposed cutting ribs carried thereby and tapering in width and height from their outer to their inner ends and adapted to have their outer ends adjusted vertically, means for adjusting the outer ends of the said ribs, a beam having its inner end pivotally secured at the radial center of the said rack and revoluble thereover, means for revolving the said beam over the said rack, a rotatable shaft carried by the beam and located to one side of the longitudinal axis thereof, a revolubly mounted gear carried by the said beam and in mesh with the said rack, a bevel gear integral with the said revolubly mounted gear, and a second bevel gear in mesh with the said bevel gear and keyed on the outer end of the said rotatable shaft.

In witness whereof I have hereunto set my hand in the presence of two witnesses.

CHARLES BRETON.

Witnesses:
A. P. L. LOCOLO,
A. BASTIEN.

Copies of this patent may be obtained for five cents each, by addressing the "Commissioner of Patents, Washington, D. C."